United States Patent
Huizinga et al.

(10) Patent No.: US 12,070,703 B2
(45) Date of Patent: Aug. 27, 2024

(54) METHOD AND APPARATUS FOR DEOXYGENATION OF LIQUIDS

(71) Applicant: Nederlandse Organisatie voor toegepast-natuurwetenschappelijk onderzoek TNO, 's-Gravenhage (NL)

(72) Inventors: Arjen Huizinga, 's-Gravenhage (NL); Earl Lawrence Vincent Goetheer, Mol (BE); Juliana Garcia Moretz-Sohn Monteiro, Alphen aan den Rijn (NL); Purvil Maganlal Khakharia, Delft (NL); Martin Mohana, Delft (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 813 days.

(21) Appl. No.: 17/040,182

(22) PCT Filed: Mar. 28, 2019

(86) PCT No.: PCT/NL2019/050192
§ 371 (c)(1),
(2) Date: Sep. 22, 2020

(87) PCT Pub. No.: WO2019/190320
PCT Pub. Date: Oct. 3, 2019

(65) Prior Publication Data
US 2021/0008465 A1   Jan. 14, 2021

(30) Foreign Application Priority Data
Mar. 28, 2018   (EP) .................................... 18164690

(51) Int. Cl.
*B01D 19/00*   (2006.01)
*B01D 53/14*   (2006.01)
(Continued)

(52) U.S. Cl.
CPC ..... *B01D 19/0031* (2013.01); *B01D 19/0005* (2013.01); *B01D 53/1425* (2013.01);
(Continued)

(58) Field of Classification Search
CPC ............ B01D 19/0031; B01D 19/0005; B01D 53/1425; B01D 53/1475; B01D 61/24;
(Continued)

(56) References Cited

U.S. PATENT DOCUMENTS 4,477,419 A * 10/1984 Pearce ............... B01D 53/1475
423/229
4,516,984 A   5/1985 Warner et al.
(Continued)

FOREIGN PATENT DOCUMENTS

ES   2358826 A1   5/2011
GB   2283015 A    4/1995
(Continued)

OTHER PUBLICATIONS

Translation of JPH0780205A, accessed 2023 (Year: 1995).*
(Continued)

*Primary Examiner* — Christopher P Jones
*Assistant Examiner* — Phillip Y Shao
(74) *Attorney, Agent, or Firm* — Banner & Witcoff, Ltd.

(57) ABSTRACT

In accordance with the present invention there is provided a method for deoxygenation of a first liquid, which method comprises contacting said first liquid with a membrane, which membrane is on its filtrate side in contact with a second liquid comprising an oxygen scavenger.
There is provided a second method for deoxygenation of a first liquid which method comprises contacting said first liquid with a membrane, which membrane is on its filtrate side in contact with an oxygen-lean sweep gas.
The invention is also directed to an apparatus for carrying out these methods.

(Continued)

The present invention provides a very efficient means to deoxygenate liquids of all sorts, such as $CO_2$ scrubbing solutions and beverages.

8 Claims, 7 Drawing Sheets

(51) Int. Cl.

| | | |
|---|---|---|
| *B01D 61/24* | (2006.01) | |
| *C02F 1/20* | (2023.01) | |
| *C02F 1/44* | (2023.01) | |
| *C02F 1/70* | (2023.01) | |
| *A23L 2/74* | (2006.01) | |
| *A23L 2/76* | (2006.01) | |
| *A23L 3/3436* | (2006.01) | |

(52) U.S. Cl.
CPC ......... *B01D 53/1475* (2013.01); *B01D 61/24* (2013.01); *C02F 1/20* (2013.01); *C02F 1/44* (2013.01); *C02F 1/70* (2013.01); *C02F 1/705* (2013.01); *A23L 2/74* (2013.01); *A23L 2/76* (2013.01); *A23L 3/3436* (2013.01); *A23V 2002/00* (2013.01)

(58) Field of Classification Search
CPC ... B01D 19/04; C02F 1/20; C02F 1/44; C02F 1/70; C02F 1/705; C02F 2209/02; C02F 2209/06; C02F 1/008; C02F 3/02; C02F 3/342; A23L 2/74; A23L 2/76; A23L 3/3436; A23V 2002/00; Y02W 10/10
See application file for complete search history.

(56) References Cited

U.S. PATENT DOCUMENTS

| | | | | |
|---|---|---|---|---|
| 4,602,987 | A * | 7/1986 | Bonaventura | H01M 8/18 205/633 |
| 5,240,853 | A | 8/1993 | Copeland et al. | |
| 6,165,433 | A * | 12/2000 | Chakravarti | B01D 53/1493 423/229 |
| 6,592,829 | B2 * | 7/2003 | Chakravarti | B01D 53/1475 422/171 |
| 7,465,336 | B2 * | 12/2008 | McHugh | B01D 19/0031 95/263 |
| 2009/0318743 | A1 * | 12/2009 | Arnold | C01B 13/0251 585/658 |
| 2017/0368495 | A1 * | 12/2017 | Mabrouk | B01D 53/1493 |
| 2018/0257935 | A1 * | 9/2018 | Ballaguet | B01D 53/76 |

FOREIGN PATENT DOCUMENTS

| | | |
|---|---|---|
| JP | H0780205 A | 3/1995 |
| KR | 101038764 B1 | 6/2011 |
| WO | 9416800 A1 | 8/1994 |
| WO | 02064238 A1 | 8/2002 |

OTHER PUBLICATIONS

Borhani et al. "Role of solvents in CO2 capture processes: The review of selection and design methods" Renewable and Sustainable Energy Reviews 114 (2009) 109299.

Kundu et al. "Development of a non-sulphite oxygen scavenger for monoethylene glycol (MEG) used as gas hydrate inhibitor" J. of Petr. Science and Eng., 158(2017)120-128.

Crowther et al. "Oxygen Selective Membranes for Li-Air (02) Batteries", in Membranes, 2012(2), pp. 216-227.

Ansaloni et al. Development of membrane contactors using volatile amine-based.

* cited by examiner

METHOD AND APPARATUS FOR DEOXYGENATION OF LIQUIDS

RELATED APPLICATIONS

This application is a National Stage Application under 35 U.S.C. 371 of co-pending PCT application PCT/NL2019/050192 designating the United States and filed Mar. 28, 2019; which claims the benefit of EP application number 18164690.2 and filed Mar. 28, 2018 each of which are hereby incorporated by reference in their entireties.

BACKGROUND OF THE INVENTION

The invention is in the field of separation technology. In particular the present invention is directed to a method and apparatus for the removal of dissolved oxygen from liquids, in particular for the removal of oxygen from $CO_2$ scrubbing liquids.

Removal of oxygen from liquids, also referred to as deoxygenation, is important for many applications.

These applications include for instance removing dissolved oxygen from $CO_2$ scrubbing liquids ($CO_2$ absorbents). $CO_2$ scrubbing for removal of $CO_2$ from the exhaust gases typically involves the use of amines, e.g. monoethanolamine as absorbents, typically in an aqueous solution. Cold solutions of these absorbents bind $CO_2$, and the binding can be reversed at higher temperatures. The binding typically takes place in a packed absorber column. Desorption is typically achieved in a stripper column in which heat is provided to desorb $CO_2$ from the $CO_2$ absorbent, after which the desorbed $CO_2$ is separated from water and other condensable components in a condenser.

Deterioration of the absorbent is mainly an oxidative degradation phenomenon of the absorbent, which is mainly caused by excess oxygen contained in the exhaust gas, which dissolves in the aqueous solution and which reacts with the absorbent. In order to prevent this degradation, deoxygenation processes can be applied.

KR101038764 for instance discloses a process for removal of dissolved oxygen from $CO_2$ absorbent fluids, in which a hollow fiber membrane is used.

WO02064238 describes the use of a flash tank for the removal of oxygen from $CO_2$ absorbent fluids, for which the application of vacuum to the flash tank is required, without which insufficient oxygen removal is achieved.

Alternatively, WO02064238 describes the use of a scrubbing column for deoxygenation. The oxygen removal scrubbing column uses desorbed $CO_2$, produced after the stripping column, as an oxygen scavenging gas. However, by contacting the absorption fluid with the $CO_2$ scavenging gas, other volatile products are also transferred as impurities to the $CO_2$ stream, leading to increased $CO_2$ purification costs.

U.S. Pat. No. 5,240,853 discloses a deoxygenation process in which biological oxygen scavengers are used. However, kinetics of such biological scavengers are typically slow, and therefore, it is difficult to reach sufficient deoxygenation.

WO9416800 and U.S. Pat. No. 4,516,984 disclose processes in which liquids are deoxygenized with the use of a membrane. However, the membranes are not selective for oxygen, meaning that volatile components of the liquid that is to be deoxygenized will permeate the membrane as well.

Other applications for deoxygenation processes are found in food industry, for instance in the removal of oxygen from wine or fruit juice. A very common way of deoxygenating wine is the addition of oxygen scavengers, such as sulfite, which is oxidized by the dissolved oxygen into sulfate. A low oxygen content is generally beneficial for the shelf life of the product.

Yet another field of application for removal of dissolved oxygen is in the oil and gas industry. Monoethylene glycol (MEG) is used as a hydrate inhibitor in the natural gas industry. For subsea injection purposes, the oxygen content in MEG must be kept at low levels, typically between 10 and 20 ppbv. However, oxygen present in fresh make-up MEG, or oxygen leakage among other factors can raise the oxygen content to ppm levels. Oxygen scavengers are added to the recycling MEG loop. The oxygen content in hydrate inhibitors must be controlled because oxygen may lead to corrosion, formation of elemental sulfur, as well as degradation of MEG and other production chemicals (see for instance Kundu and Seiersten, Journal of Petroleum Science and Engineering 158 (2017) 120-128). Oxygen scavengers directly applied to MEG, and their oxidation products, should be soluble in concentrated MEG and in MEG solutions with dissolved salts. The demand for high efficiency at low temperature (5-50° C.) and medium pH (4-8) restricts the number of oxygen scavengers candidates.

Other prior art methods of deoxygenation suffer from various other drawbacks. The process described in KR101038764 for deoxygenizing $CO_2$ absorption fluids for instance, requires the application of a vacuum to filtrate side of the membrane to obtain sufficient oxygen removal from the absorption liquid.

Oxidative degradation of liquids may be avoided by addition of oxygen scavengers. Sulfite salts or hydrazine in the presence of a catalyst are typically used to remove dissolved oxygen from water by means of oxidation-reduction reaction. However, deoxygenation of a liquid by addition of oxygen scavengers may be undesirable. For instance, addition of sulfite salts can lead to the accumulation of salts in the liquid, which may lead to degradation of the liquid. There is also evidence of increased loss of solvent by degradation when typical scavengers such as hydroquinone, ascorbic acid, manganese sulfate and potassium permanganate are used.

Addition of sulfite or other scavengers to food products may be undesirable, for instance because many consumers are intolerant to such compounds.

$CO_2$ scrubbing processes typically comprise an absorber sump in order to improve process controllability. Methods described in the prior art, such as WO02064238, promote the removal of dissolved oxygen downstream the absorber sump. However, due to the relatively high residence time and oxygen content, it is estimated that a significant extent of the degradation reactions take place in the absorber sump itself. Therefore, an effective deoxygenation process should be combined with a reduction of the residence time of the liquid in the absorber sump.

An object of the present invention is to find an improved deoxygenation process, which can be applied in the industries above, e.g. in deoxygenation of $CO_2$ capturing solutions and beverages, as well as other solutions that require removal of dissolved oxygen. Typically the process of the invention should be carried out on an industrial scale. An apparatus for carrying out the process of the invention is ideally versatile and compact, so as to facilitate for instance deoxygenation of beverages that are already filled in bottles or other containers, or retrofitting in already existing plants. Preferably, the deoxygenation process of this invention should not decrease the quality of the deoxygenized liquid.

It was found that these objects can be met by a employing membrane in combination with an oxygen scavenger on the filtrate side of the membrane. Thus, in a first aspect, the present invention is directed to a method for deoxygenation of a first liquid, which method comprises contacting said first liquid with a membrane, which membrane is on its filtrate side in contact with a second liquid comprising an oxygen scavenger. Alternatively, the membrane is on its filtrate side in contact with an oxygen-lean gas, which serves as a sweep gas. $CO_2$ that is desorbed from a $CO_2$ scrubbing liquid, for instance in a stripper column, may act as oxygen-lean sweep gas.

Furthermore, it was found that deoxygenation of $CO_2$ scrubbing liquids can be improved by reducing the residence time of the $CO_2$ scrubbing liquid in the absorber sump prior to deoxygenation.

BRIEF SUMMARY OF THE INVENTION

In accordance with the present invention there is provided a method for deoxygenation of a first liquid, which method comprises contacting said first liquid with a membrane, which membrane is on its filtrate side in contact with a second liquid comprising an oxygen scavenger.

There is provided a second method for deoxygenation of a first liquid which method comprises contacting said first liquid with a membrane, which membrane is on its filtrate side in contact with an oxygen-lean sweep gas.

The invention is also directed to an apparatus for carrying out these methods.

The present invention provides a very efficient means to deoxygenate liquids of all sorts, such as $CO_2$ scrubbing solutions and beverages. Since the method does not require oxygen scavengers to be added directly to the liquid, the quality of the deoxygenated liquids is maintained.

DETAILED DESCRIPTION OF THE INVENTION

According to the invention a liquid which contains dissolved oxygen is contacted with a membrane. According to the first method of the invention, the membrane is on its filtrate side in contact with a second liquid, which comprises an oxygen scavenger. According to the second method of the invention, the membrane is on its filtrate side in contact with an oxygen-lean sweep gas.

Without wishing to be bound by theory, it is assumed that the process of the invention is efficient because of the driving force that is obtained by the presence of the oxygen scavenger or oxygen-lean sweep gas on the filtrate side. Either selective membranes or membrane contactors can be used.

Figure 2:
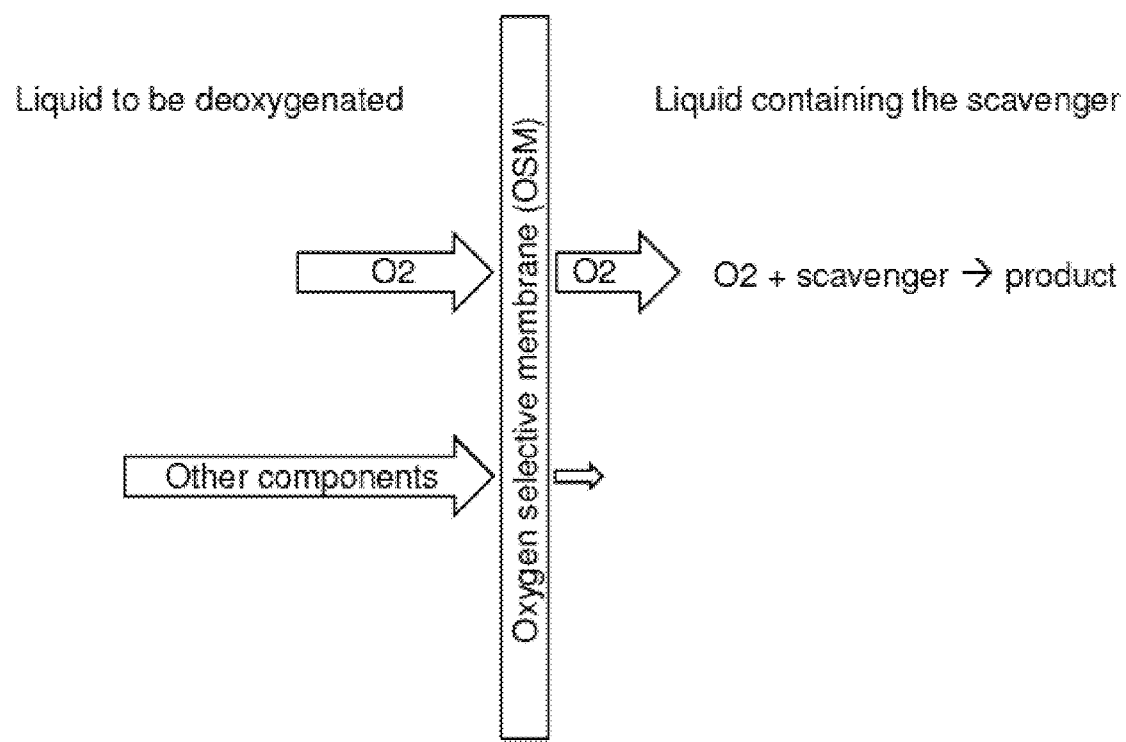
FIG. 2 is a schematic representation of an oxygen selective membrane (OSM).
Figure 3:
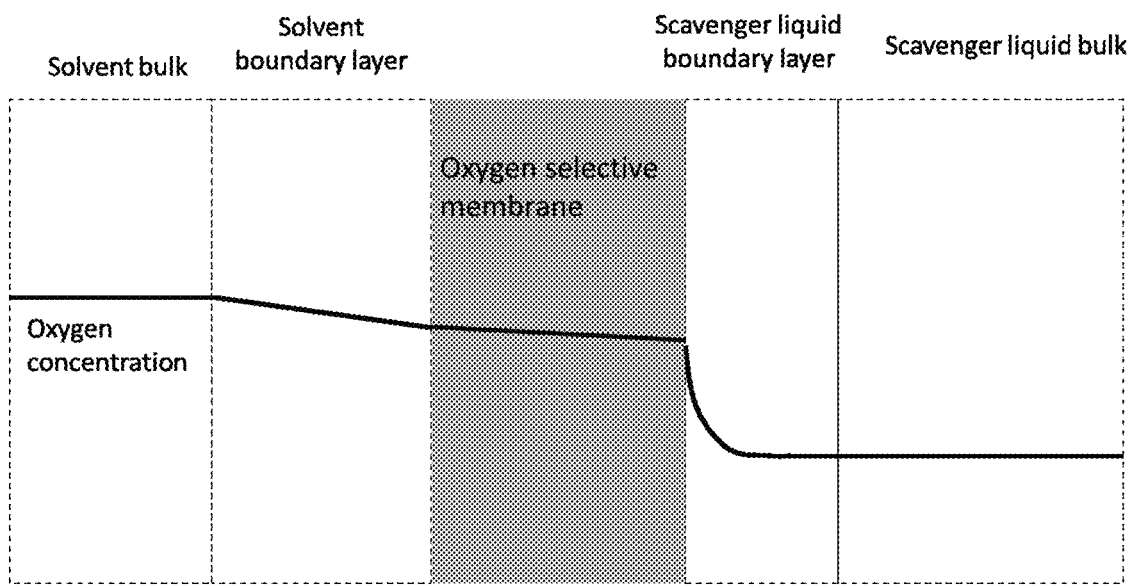
FIG. 3 is a schematic representation of the oxygen transport mechanism when an oxygen selective membrane is used with a scavenger liquid on the filtrate side.
Figure 4:
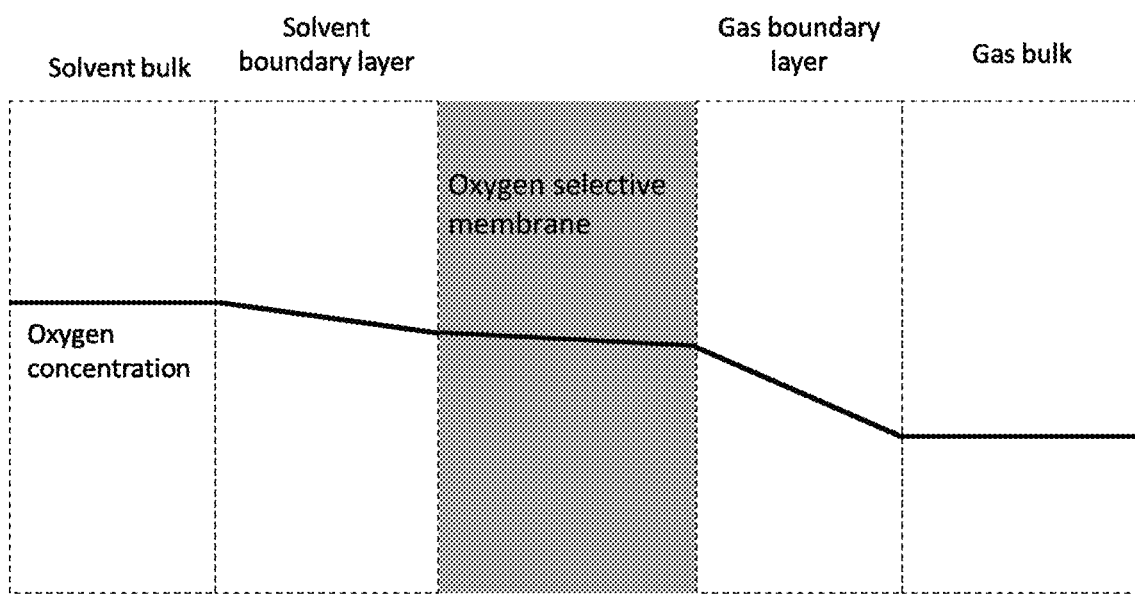
FIG. 4 is a schematic representation of the oxygen transport mechanism when an oxygen selective membrane is used with an oxygen-lean sweep gas on the filtrate side.

With reference to FIGS. 2 and 3, if selective membranes are used in combination with a liquid phase which comprises an oxygen scavenger, it is assumed that oxygen from the target liquid on the left hand side diffuses through the membrane into the liquid phase which comprises the oxygen scavenger, which in turn reacts or binds with the oxygen, thus depleting the liquid phase on the filtrate side of the membrane in oxygen, so that a driving force is maintained. With reference to FIGS. 2 and 4, in case selective membranes are used in combination with an oxygen-lean sweep gas, the flow of oxygen-lean sweep gas results in depleting the filtrate side of the membrane in oxygen, so that a driving force is maintained.

Figure 5:
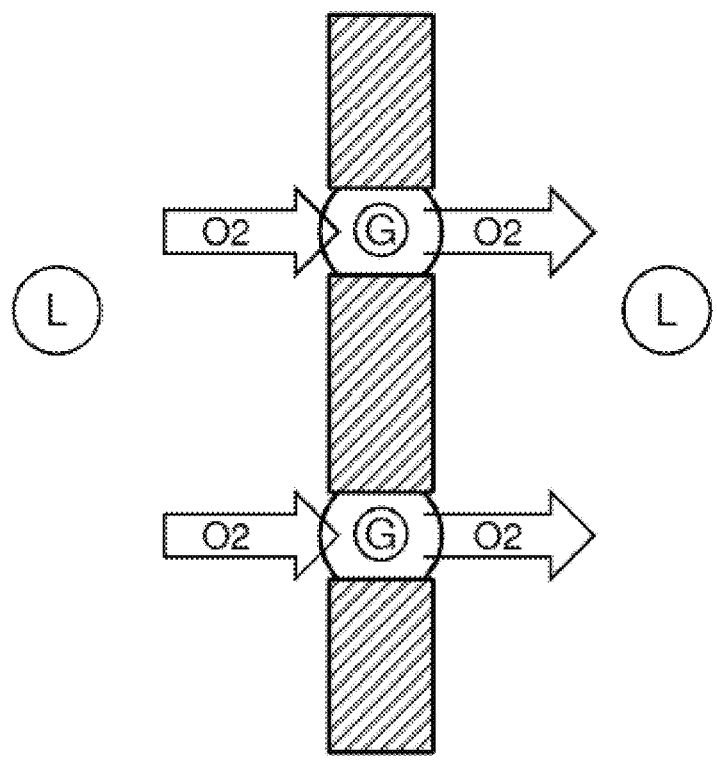
FIG. 5 is a schematic representation of a membrane portion, in particular a portion of a porous membrane contactor.
Figure 6:
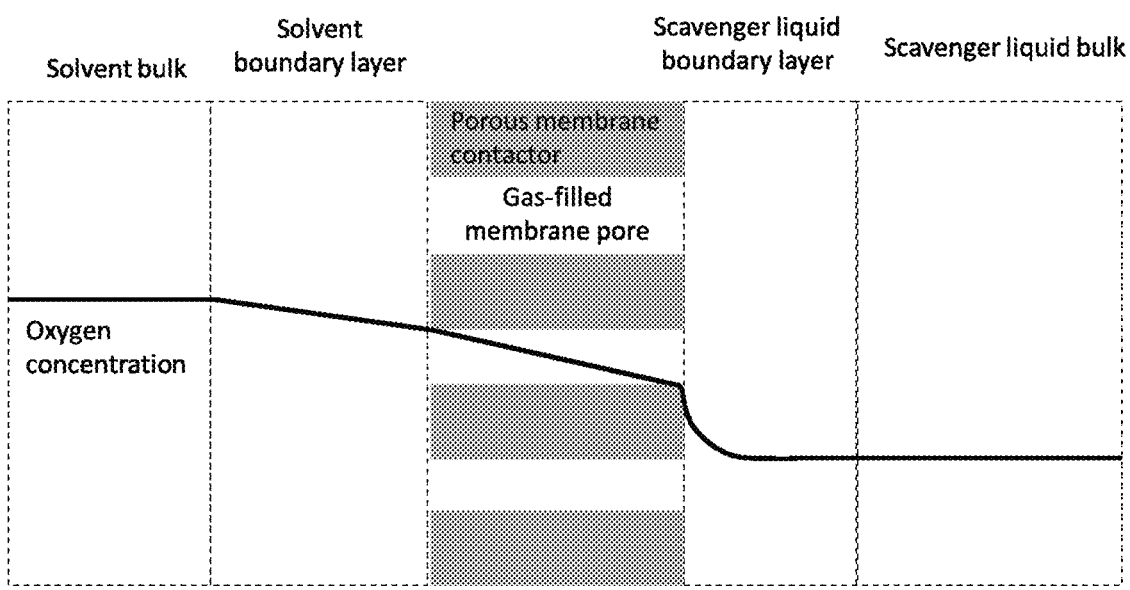
FIG. 6 is a schematic representation of the oxygen transport mechanism when a porous membrane contactor is used with a scavenger liquid on the filtrate side.
Figure 7:
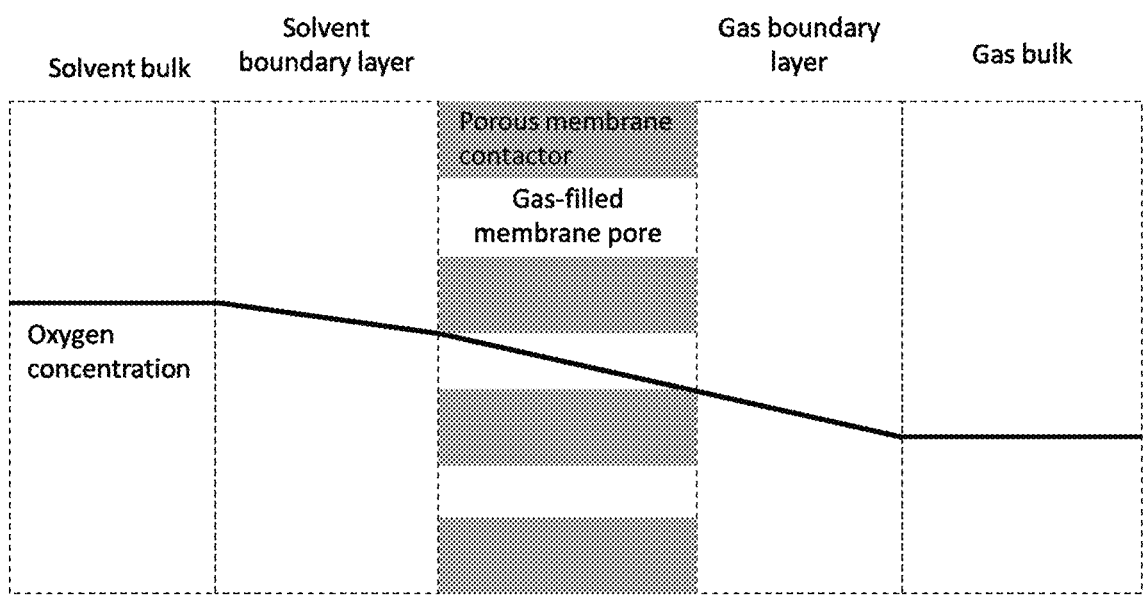
FIG. 7 is a schematic representation of the oxygen transport mechanism when a porous membrane is used with an oxygen-lean sweep gas on the filtrate side.

With reference to FIGS. 5 and 6, if membrane contactors are used in combination with a liquid phase which comprises an oxygen scavenger, the oxygen from the target liquid on the left hand side must first diffuse into the gas phase, which is present in the pores of the membrane contactor (indicated by the circled G in FIG. 5). From this gas phase the oxygen can diffuse into the liquid phase which comprises the oxygen scavenger, which in turn reacts or binds with the oxygen, thus depleting the gas phase in the pores of the membrane contactor in oxygen, so that the driving force is maintained. With reference to FIGS. 5 and 7, in case membrane contactors are used in combination with an oxygen-lean sweep gas, the flow of oxygen-lean sweep gas results in depleting gas phase in the pores of the membrane contactor in oxygen, so that a driving force is maintained.

In accordance with the invention membrane contactors as well as selective membranes can be used. The membrane acts as a mechanical barrier that lowers or completely avoids direct contact between the oxygen scavenger or the oxygen-lean gas, and the liquid to be deoxidized.

Aspects such as the membrane geometry, gas and liquid velocities, scavenger concentration, the presence and nature of a catalyst can all be manipulated so that the oxygen removal is maximized.

In a preferred embodiment, the membrane used is an oxygen selective membrane (OSM). These membranes have the advantage of (partially) avoiding the diffusion of components other than oxygen into the liquid that contains the oxygen scavenger, or into the oxygen-lean sweep gas. FIG. 2 schematically depicts the working of an OSM. Because an OSM is selective, the diffusion of other components to the filtrate side is greatly reduced, thus reducing/eliminating losses. OSMs typically provide a selectivity for diffusion of oxygen that is 10,000 to 100,000 times higher, relative to the selectivity for diffusion other molecules, such as amines.

OSMs can be synthesized or commercially obtained as polymeric films. The films can take the shape of films, gels, liquids immobilized in a porous inert substrate, and the like. Suitable OSMs are summarized Crowther and Salomon (Membranes 2 (2012) 216-227, accessible at http.//www.mdpi.com/2077-0375/2/216, accessed on 28 Mar. 2018 and 28 Mar. 2019).

Two preferred groups of materials for fabrication of OSMs in various configurations are fluorinated hydrocarbons and silicon based compounds. Combinations of one or more compounds from each of these groups are also possible. It follows from the above that the materials for fabrication of OSMs are present in the fabricated OSM itself.

Suitable fluorinated hydrocarbons for the purpose of the present invention are for instance perfluoropolyether (PFPE) (e.g. commercially obtainable as Krytox™ 1506), polymeric perfluoro compounds, for instance those described in U.S. Pat. No. 5,985,475, such as polyperfluoroalkyl oxides, polyperfluoroalkyl amines, which are optionally UV cured. Typical values for $P(O_2)$ are up to 1000 Barrer (with $P(O_2)/P(H_2O)$ about 3-4 or more). Plastics from the Teflon® AF family as described in Ansaloni et al. (Journal of Membrane Science, 537 (2017) 272-282 are also suitable.

Suitable silicon based compounds are polysiloxanes, silicone oils, fluorinated polysiloxanes, and fluorinated polysiloxane copolymer with alkyl methacrylates. Polysiloxanes are thermally stable, exhibit high 02 solubilities, can be used as a liquid immobilized in an inert polymer and thermally or UV cured (vulcanized) to produce a silicon rubber. Typical values for the permeability of $O_2$ in dimethylsilicone rubbers are above 600 Barrer, and around 100-250 Barrer in methacryloxypropyl terminated polydimethyl contact lenses.

Other materials that may be used as an OSM are Melinex™ 301E1 (ML), high density polyethylene (HDPE), silicalite zeolite or polytetrafluoroethylene (PTFE) (e.g. on nickel foam support), silicone oil immobilized in PTFE or nickel/yttria stabilized zirconia (YSZ)/silicate layered membranes, and Teflon™ (PTFE) coated fiberglass cloth (TCFC) with and without a silicone adhesive layer.

The membranes may be in the form of flat sheets, or other well known configurations, such as hollow fiber membranes.

Suitable oxygen scavengers for use in the present invention are reducing agents that react selectively and typically irreversibly with oxygen. The scavenger functionality relies on chemical reactions of specially selected and formulated substrates with oxygen. The scavenging substrate acts as a reducing agent by chemically binding gaseous or dissolved molecular oxygen before it can react with the product. Oxygen scavengers formulations may contain either organic or inorganic compounds.

Examples of inorganic scavengers are Fe(0), Fe(II), sulfites (e.g. sodium sulfite), bisulfites, hydrazine and oxygen deficient metal oxides, such as described in WO2017203912. To enhance the solubility of metal species in the liquid from which oxygen is to be removed, chelating agents can be used, which form coordinate bonds. For instance, ethylenediaminetetraacetic acid (EDTA) is used to solubilize iron ions in water. Further examples can be found in KR101571062. Sulfites are fast and low in cost, and therefore are the most commonly used inorganic scavengers.

Examples of organic scavengers commonly used for water treatment pressure boilers include carbohydrazide, methylethylketoximes, hydroquinone, hydroxylamines, sodium erythorbate and ascorbic acid.

Furthermore, antioxidants are commonly used in the food and beverage industry. CN103007687 describes the suitable antioxidants such as xylitol, threitol, dithiothreitol, erythritol, ethylene glycol, butanediol and other structurally similar sugar alcohols and glycol compounds. Boric acid is used as an oxygen scavenger for rice, ascorbic acid (KR20170141986) is used for this purpose with fruits and fresh vegetables.

Unsaturated fatty acids, such as vegetable oils (see e.g. CA2992430), and hydrocarbons such as isoprene, butadiene and squalene are used as oxygen scavengers in all types of packaged food. These compounds are often used in combination with catalysts and iron or cobalt carriers. Suitable catalysts include transition metal catalysts, as described in EP2915842. The use of oxygen scavenging polymers is discussed in AU2014363890.

The use of promoters in combination with oxygen scavengers is also common. For instance, oximes (described in U.S. Pat. No. 4,487,745) may be used in combination with a quinone promotor, as described in U.S. Pat. No. 5,686,016.

An overview of suitable oxygen scavenger materials is given in U.S. Pat. No. 9,441,157.

Also combinations of these scavengers and catalysts or promoters may be used in accordance with the present invention.

The main advantage of the present invention is that the oxygen scavenger does not have to be added to, and does not have to be in direct contact with the liquid to be deoxygenated. Therefore, the products of the reaction between the scavenger and oxygen are also not present in the liquid. Thus, the choices of scavengers to be used in a specific application are not hindered by factors such as the compatibility between the scavenger (or its products) and the liquid to be deoxidized. This may enable the use of cheaper and readily available scavengers in many of the previously discussed applications, such as $CO_2$ capture processes. In addition, this may also enable the use of solvent formulations which are prone to oxidative degradation, but otherwise effective for $CO_2$ absorption.

Figure 9:
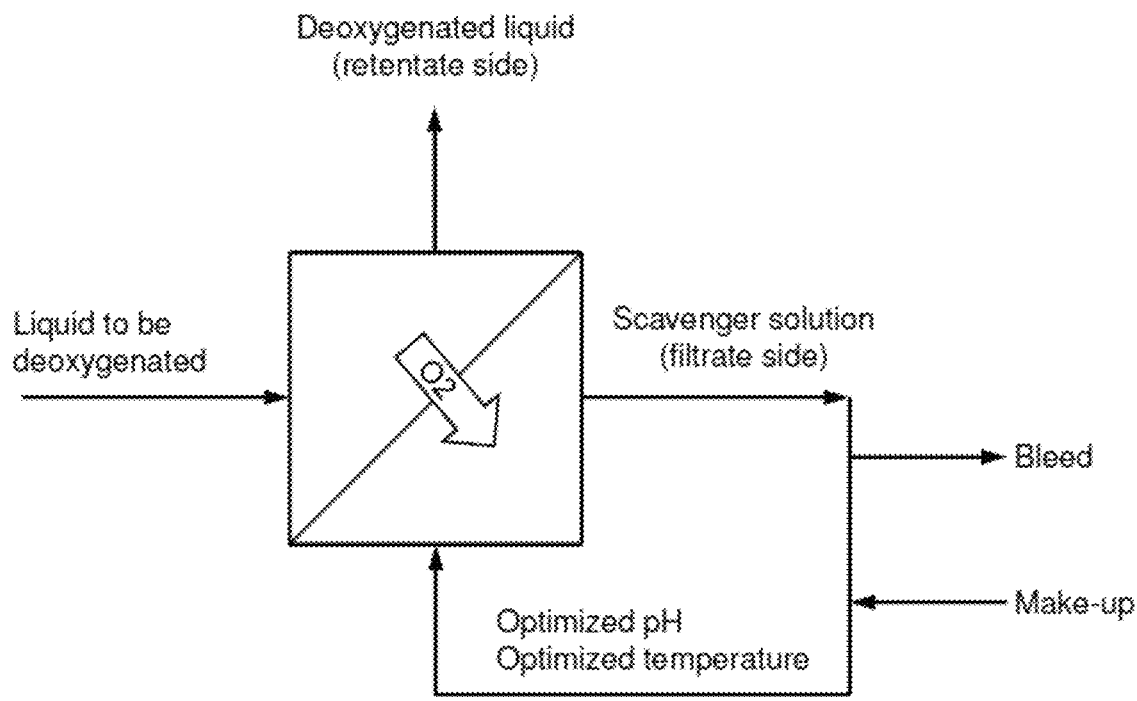
FIG. 9 is a schematic representation of continuous operation of a process in accordance with the first method of the present invention.
Figure 10:
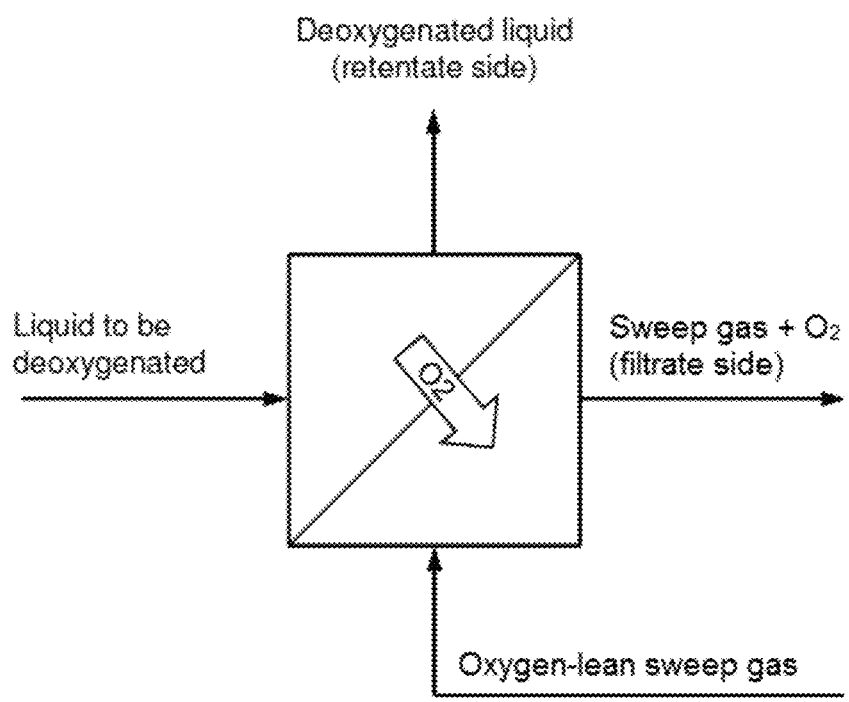
FIG. 10 is a schematic representation of continuous operation of a process in accordance with the second method of the present invention.

Another advantage is that the deoxygenation reaction takes place in an environment which may be controlled to ensure fast and complete oxygen removal, by optimizing the pH and temperature of the liquid containing the scavenger. This is schematically depicted in FIG. 9.

Figure 1:
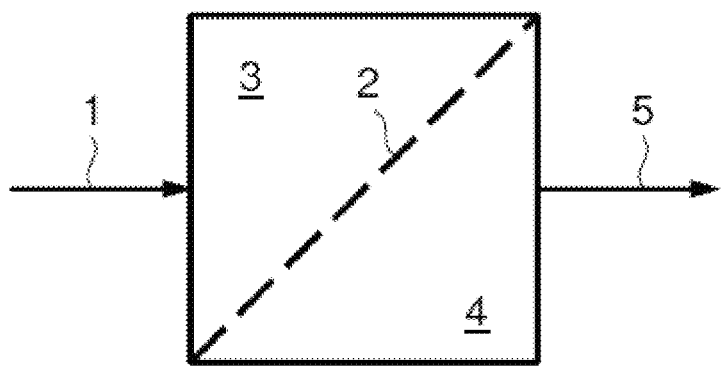
FIG. 1 is a schematic representation of a setup employed in the present invention.

The invention can be carried out in batch or continuously. With reference to FIG. 1, feed stream (1), which contains dissolved oxygen may be fed into the compartment that is formed by retentate side of the membrane (3). Oxygen depleted liquid may then be fed away from this compartment by an exhaust line (not shown), which may be done continuously or batchwise. Similarly, the liquid containing the oxygen scavenger or the oxygen-lean sweep gas is presented to the compartment by a feeding line (not shown) which discharges in filtrate side of the membrane (4). In case a liquid containing an oxygen scavenger is used, the oxygen is captured by the scavenger. Effluent (5) containing the spent scavenger is fed away and may be discarded or reused after it has been brought back in a reduced state. In case an oxygen-lean sweep gas is used, effluent (5) comprises sweep gas and oxygen. This part of the operation can also be carried out continuously or batchwise.

An apparatus according to the invention can be designed so as to fit through the opening of containers for the beverage industry. In this way filled containers (bottles, cans, and the like) can be deoxygenized after they have been filled. Alternatively, the apparatus can be installed so that the liquids are deoxygenated during the filling process.

Figure 8:
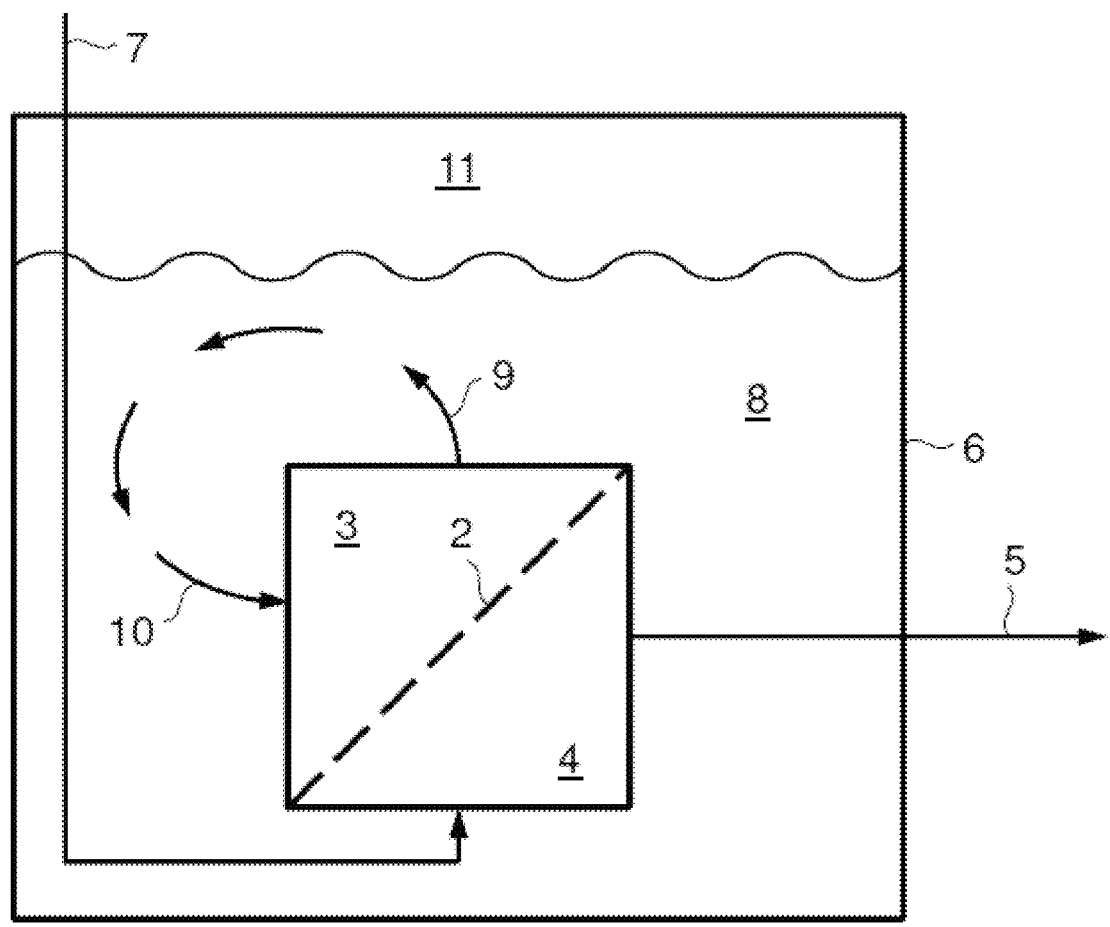
FIG. 8 is a schematic representation of an apparatus according to the present invention.

FIG. 8 is a schematic representation of an apparatus in accordance with the present invention. An apparatus according to the invention can be designed so as to be installed inside container (6) (e.g. a storage or aging tank), so that liquid (8) held in said container (6) is deoxygenated on retentate side (3) of the membrane by contacting it with membrane (2) e.g. by allowing the stored liquid to enter the volume of the retentate side. At the same time a liquid containing an oxygen scavenger is fed by feed (7) to filtrate side (4), either continuously or batchwise. This apparatus and method can be used in the beverage industry to avoid the drawbacks of adding scavenger directly to the beverage. Moreover, this method can substitute the use of vacuum and/or heat when deoxygenating beverages. The use of vacuum, for instance as described in U.S. Pat. No. 5,006,354, may lead to undesirable loss of volatile components, thus altering the products aroma and taste. This is especially true if vacuum is combined with heat, which may be needed to enhance deoxygenation efficiency. It is to be understood that headspace (11) that is depicted in container (6) is normally absent (because the container is completely filled with liquid), or filled with an inert gas, such as a nitrogen.

Preferably, the time between absorption of $O_2$ of the $CO_2$ scrubbing liquid and deoxygenation is 10 minutes or less, further preferably 5 minutes or less, such as 1 minute or less, in order to prevent degradation of the scrubbing liquid prior to deoxygenation. To this end, an absorber sump or solvent buffer tank may be positioned downstream of the deoxygenation process. The residence time of the deoxygenized liquid in the absorber sump downstream of the deoxygenation process can be chosen according to the process variables, without long residence times resulting in degradation of the scrubbing liquid.

Figure 11:
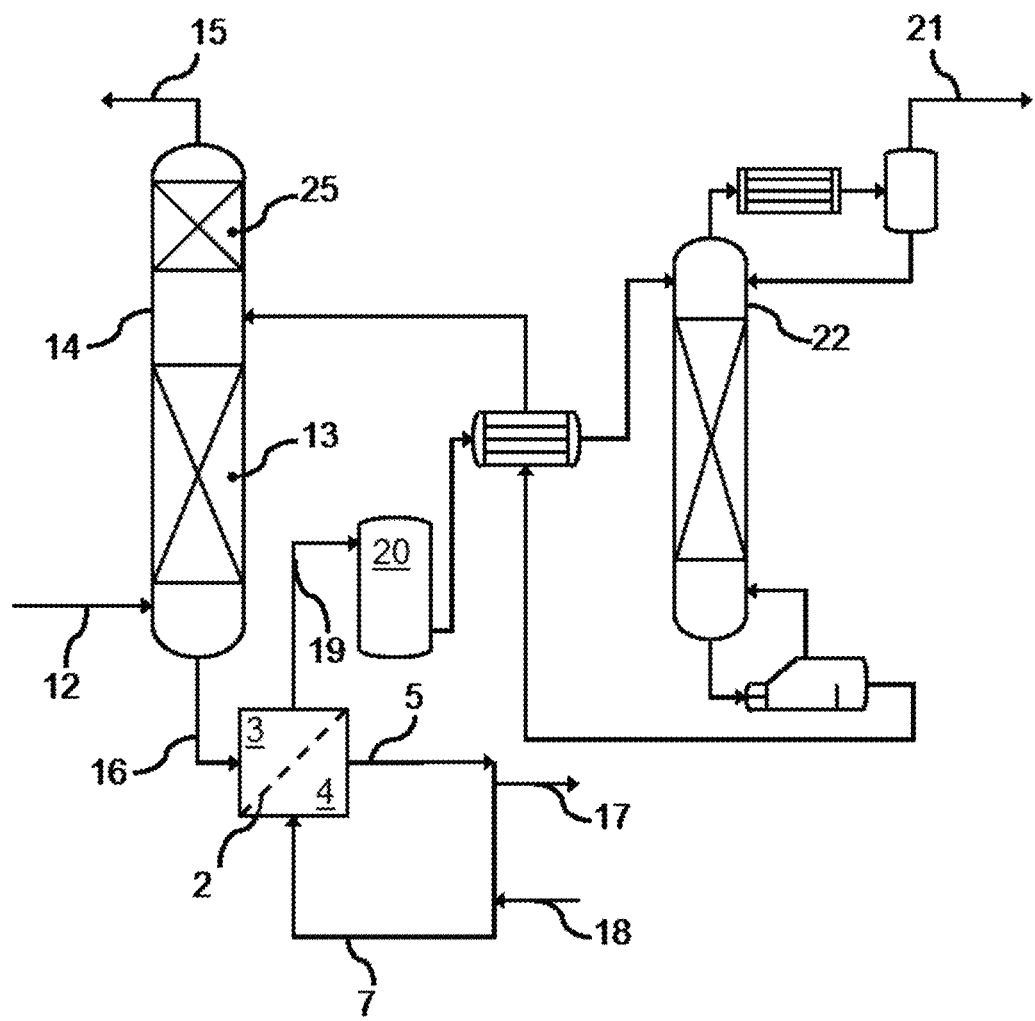
FIG. 11 is a schematic representation of a continuous process for deoxygenation of a $CO_2$ scrubbing liquid in accordance with the first method of the invention.

FIG. 11 is a schematic representation of a process for continuous deoxygenation of a $CO_2$ scrubbing liquid, using a membrane and a liquid comprising an oxygen scavenger. The $CO_2$ scrubbing liquid is contacted with exhaust gas containing at least $CO_2$ and $O_2$ (12). In packed section (13) of absorber column (14), $CO_2$ is absorbed in the scrubbing liquid. Albeit undesirably, oxygen may also be absorbed. $CO_2$ depleted gas (15) exits from the top of the absorber column (14). Downstream the packed section of the absorber column, scrubbing liquid which contains dissolved $CO_2$ and oxygen (16) is contacted with membrane contactor (2) or OSM (2), according to the invention. On filtrate side (4) of the membrane (2), a liquid comprising an oxygen scavenger is provided via scavenger feed (7). The pH and temperature of the scavenger feed (7) can be optimized for effective oxygen removal. Bleed (17) is used for collecting spent scavenger from effluent (5) in order to bring it back into a reduced state and/or discarding the spent scavenger. Make-up (18) is used for adding fresh scavenger and/or reintroducing reduced spent scavenger. Deoxygenized $CO_2$ scrubbing liquid (19) is fed to absorber sump (20), which is located downstream of the deoxygenation process, thereby preventing degradation of $CO_2$ scrubbing liquid due to potentially long residence times in the absorber sump (20).

Figure 12:
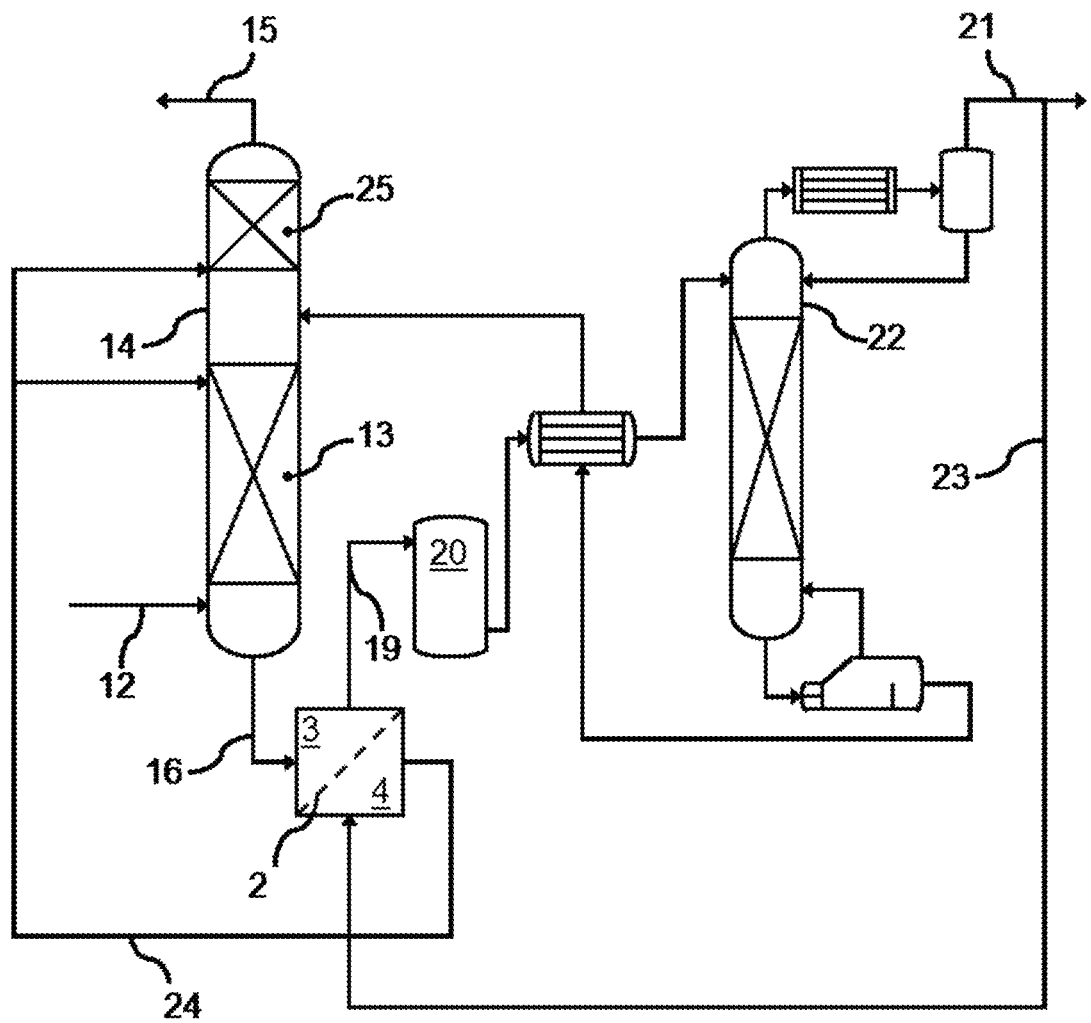
FIG. 12 is a schematic representation of a continuous process for deoxygenation of a $CO_2$ scrubbing liquid in accordance with the second method of the invention.

FIG. 12 is a schematic representation of a process for continuous deoxygenation of a $CO_2$ scrubbing liquid, using a membrane and $CO_2$ as oxygen-lean sweep gas. A fraction of desorbed $CO_2$ (21) which comes from stripper column (22) is fed as oxygen-lean sweep gas (23) to the filtrate side (4) of the membrane (2). In case a membrane contactor is used, sweep gas exiting the membrane filtrate side (24) may comprise other compounds, such as volatile compounds of the $CO_2$ scrubbing liquid, in addition to oxygen. In order to prevent losses of $CO_2$ scrubbing liquid, the sweep gas exiting the membrane filtrate side (24) may be reintroduced into the absorber column (14), either in the upper portion of the packed section (13), or in between the packed section (13) and water wash section (25) of the absorber column (14).

The method of the invention can also be used to deoxygenate MEG. By avoiding the addition of the oxygen scavenger directly to MEG, problems related to solubility and compatibility are avoided. Moreover, the pH of the scavenger solution can be controlled independent of the pH of the MEG solution, allowing the use of well-known oxygen scavengers that work optimally at pH above 9.

All references cited herein, both patent literate and non patent literature, are incorporated herein by reference.

EXAMPLES

In a bench scale $CO_2$ capture system, a synthetic gas mixture containing 10 vol % oxygen, 27 vol % $CO_2$ and nitrogen for balance was contacted with an aqueous solution of monoethanolamine (MEA). The fresh MEA solution contained 25 wt % MEA, and water for balance.

A Liqui-Cel® membrane module, packed with a polypropylene (PP) membrane with 25% porosity, with an effective pore size of 0.04 micron was used for oxygen removal, arranged in hollow fibers with outer diameter and inner diameters of 300 and 200 micron, respectively (commercial name: X40 fiber).

A Memosens COS81D optode from Endress+Hauser was used to measure the oxygen content in the MEA solution, both upstream and downstream the membrane contactor. The sensor has oxygen-sensitive molecules (markers) which are integrated into an optically active layer (fluorescence layer). The sensor can be used between 0 to 60° C., and 0.02 to 13 bar. This is within the expected range for rich amine downstream of the absorber in the bench scale $CO_2$ capture system, where the optode is installed. The measuring range is from 4 µg/L to 30 mg/L. The measurements are sensitive to the conductivity of the solution. Therefore, a conductivity sensor is coupled to the Memosens system.

The operational regimes used during the experimental tests described below are chosen in order to obtain the desired oxygen content levels in a bench scale test, for a relevant proof-of-concept, and are not optimized for direct industrial application.

Example 1

The solvent circulation flowrate was kept at 5.4 kg/h. The synthetic exhaust gas flowrate was 0.2 kg/h. The obtained rich solvent solution contained 3.1 mg/L of oxygen. By using nitrogen on the filtrate side of the membrane as oxygen-lean gas, with a flowrate of 5 L/h, the oxygen content was reduced to 0.45 mg/L, which is equivalent to a reduction of 85.6%.

Example 2

The solvent circulation flowrate was kept at 5 kg/h. The synthetic exhaust gas flowrate was 0.3 kg/h. The obtained rich solvent solution contained 1.9 mg/L of oxygen. By using nitrogen on the filtrate side of the membrane as oxygen-lean gas, with a flowrate of 5 L/h, the oxygen content was reduced to below detection limit, which is 4 µg/L.

Example 3

The solvent circulation flowrate was kept at 5.6 kg/h. The synthetic exhaust gas flowrate was 0.5 kg/h. The obtained rich solvent solution contained 1.6 mg/L of oxygen. By using nitrogen on the filtrate side of the membrane as oxygen-lean gas, with a flowrate of 1 L/h, the oxygen content was reduced to below detection limit, which is 4 µg/L.

Example 4

The solvent circulation flowrate was kept at 5.6 kg/h. The synthetic exhaust gas flowrate was 0.5 kg/h. The obtained rich solvent solution contains 1.6 mg/L of oxygen. By using $CO_2$ on the filtrate side of the membrane as oxygen-lean gas, with a flowrate of 1 L/h, the oxygen content was reduced to below detection limit, which is 4 µg/L. Therefore, the results of operating with nitrogen (example 3) and $CO_2$ as a sweep gas are comparable.

Example 5

The solvent circulation flowrate was kept at 5.6 kg/h. The synthetic exhaust gas flowrate was 0.5 kg/h. The obtained rich solvent solution contained 1.6 mg/L of oxygen. By using nitrogen on the filtrate side of the membrane as oxygen-lean gas, with a flowrate of 1 L/h, the oxygen content was reduced to below detection limit, which is 4 µg/L.

Example 6

The solvent circulation flowrate was kept at 8.6 kg/h. The synthetic exhaust gas flowrate was 0.2 kg/h. The obtained rich solvent solution contained 3.3 mg/L of oxygen. By using a liquid scavenger (0.8M aqueous solution of sodium sulfite with cobalt(II) chloride hexahydrate as a catalyst) on the filtrate side of the membrane, with a flowrate of 1 L/h, the oxygen content was reduced to 0.9 mg/L, which is equivalent to a reduction of 73%.

The invention claimed is:

1. A method for deoxygenation of a first liquid comprising contacting said first liquid with a membrane, which membrane is on its filtrate side in contact with an oxygen-lean sweep gas, wherein the first liquid is a $CO_2$ scrubbing liquid,
   wherein contacting said first liquid with said membrane takes place downstream of an absorber column, and
   wherein contacting said first liquid with said membrane takes place 10 minutes or less after said first liquid exits said absorber column.

2. The method according to claim 1, wherein said sweep gas is $CO_2$.

3. The method according to claim 1, wherein said sweep gas is obtained from a stripper column.

4. The method according to claim 1, wherein said sweep gas is introduced in an absorber column after having been in contact with said membrane, in order to recover volatile components of said first liquid present that are present in said sweep gas.

5. The method according to claim 1, wherein said membrane is a membrane contactor.

6. The method according to claim 1, wherein said membrane is an oxygen selective membrane (OSM).

7. The method according to claim 6, wherein said OSM comprises fluorinated hydrocarbons, silicon based compounds or combinations thereof.

8. A method for deoxygenation of a first liquid comprising contacting said first liquid with a membrane, which membrane is on its filtrate side in contact with an oxygen-lean sweep gas, wherein the first liquid is a $CO_2$ scrubbing liquid,
   wherein contacting said first liquid with said membrane takes place downstream of an absorber column,
   wherein an absorber sump is located downstream of contacting said first liquid with said membrane.

* * * * *